United States Patent [19]
Davenport

[11] Patent Number: 4,657,272
[45] Date of Patent: Apr. 14, 1987

[54] WHEELED VEHICLE

[76] Inventor: James M. Davenport, 28212 Bluebell Dr., Laguna Niguel, Calif. 92677

[21] Appl. No.: 774,993

[22] Filed: Sep. 11, 1985

[51] Int. Cl.$^4$ ............................................... B62K 5/04
[52] U.S. Cl. ..................................... 280/266; 280/282
[58] Field of Search ................. 280/205, 281 LP, 282, 280/87.04 A, 266

[56] References Cited

U.S. PATENT DOCUMENTS

| | | | |
|---|---|---|---|
| 360,017 | 3/1887 | Hernandez | 280/7.15 |
| 524,019 | 8/1894 | Desmond | 280/205 |
| 638,963 | 12/1899 | Ganswindt | 280/205 |
| 2,950,127 | 8/1960 | Phillips | 280/304 |
| 3,083,036 | 3/1963 | Cornell et al. | 280/205 |
| 3,437,351 | 4/1969 | St. Clair Newbern | 280/205 |
| 4,198,072 | 4/1980 | Hopkins | 280/267 |
| 4,279,429 | 7/1981 | Hopkins et al. | 280/267 |
| 4,417,743 | 11/1983 | Garel | 280/282 X |
| 4,523,770 | 6/1985 | Lee | 280/282 X |

FOREIGN PATENT DOCUMENTS 2122557  1/1984  United Kingdom ................ 280/205

OTHER PUBLICATIONS

Proceedings of the Fourth Symposium on Human Factors and Industrial Design in Computer Products, St. Paul, MN (1985).
S. Russell, "Inventors Come of Age," Venture Magazine, pp. 42 to 44 (Dec. 1984).
E. J. Stefanides, "Tricycle Gives High Stability, Tight Cornering," Design News (Mar. 1984).
"The Bicycle," Industrial Design Magazine, pp. 36 to 41 (Jul./Aug. 1983).
Thomas Ferrick, Jr., "A paraplegic Invents A Stable Handcycle," The Philadelphia Inquirer (Nov. 1982).
Product brochure of Victory Lane Recreational Products of Walla Walla, Washington.
Product brochure of the "Unicycle".
Product brochure of Ellefson Engineering, Inc. of Chaska, MN.
Product brochure of Landspeeder, Inc. of Westport, CT.
Product brochure of Landspeeder, Inc. of Westport, CT.
Product brochure of Trail Mate of Sarasota, FL.
Product brochure of New England Handcycles, Inc. of Brookline, MA.
"The Trike—Hand-Powered Mobility," Magazine article.

Primary Examiner—John J. Love
Assistant Examiner—Charles R. Watts
Attorney, Agent, or Firm—Workman, Nydegger & Jensen

[57] ABSTRACT

A new and unique wheeled vehicle comprising a unicycle-like device. The device employs the same general elements as a unicycle including a single large drive wheel, a pair of pedals, a seat, and a pair of forks to support the seat. Attached to the rear of the device is an additional set of support wheels. The support wheels are attached through a support frame which extends generally rearwardly and downwardly from the center of the drive wheel. The support wheels are attached to one another by an axle, which is in turn attached to the support frame in such a manner that the support wheels pronate and track through turns as the drive wheel is turned to the right or left. Under normal conditions the support wheels remain on the ground at all times. This device provides the rider with additional longitudinal stability without adding a significant increment of lateral stability.

25 Claims, 4 Drawing Figures

WHEELED VEHICLE

BACKGROUND

1. The Field of the Invention

The present invention relates to a new and unique cycling device. Specifically, the present invention relates to a unicycle having an additional pair of rear wheels which provide longitudinal stability, but which are not intended to provide significant lateral stability.

2. Background of the Invention

The general concept of the unicycle is well known and appreciated. Specifically, the unicycle generally comprises a single large wheel having a seat mounted thereon. In addition, a set of pedals is generally attached to the wheel in order to provide a means for driving the unicycle. A rider then sits on the seat while placing his feet on the pedals. The unicycle is then propelled by turning the pedals while the rider balances on the seat. Generally, the rider's hands are free to aid in attempting to balance the cycle.

Many of the early velocipedes, predecessors to the modern bicycle, applied some of the general concepts of the unicycle. Specifically, many of the early velocipedes employed a large wheel having a seat mounted directly above the large wheel. Generally, a pair of pedals were attached to the large wheel. These pedals were often attached directly through the axle of the wheel or were at times placed in communication with the wheel through a chain or other type of drive mechanism. In contrast to the usual unicycle, most of these early velocipedes included handle bars so that the rider had a place for his hands and a way of steering the velocipedes.

Some of the early velocipedes combined certain of the characteristics of a unicycle together with a securely attached rear wheel. The rear wheel was of varying size, but in the case of the early velocipedes, was often much smaller than the front drive wheel which held the seat and the drive mechanism.

Numerous variations on the general velocipede concept were later developed. Some of these variations included a large center wheel having both small forward and rear wheels added for stability. One velocipede employed a small rear wheel along with a skid plate on the front and/or rear of the device. Generally, however, the pedals or other drive mechanisms were moutned to the large drive wheel, as was the seat and possibly a set of handle bars.

Eventually, the velocipede concept was divided into two different directions. These directions produced the commonly known bicycle and the commonly known unicycle. The primary difference between the two was, of course, the use of two wheels in the bicycle and the use of only one wheel in a unicycle.

The modern and generally accepted bicycle now comprises a set of two wheels of similar size. The two wheels are, then connected by a frame. Mounted to the frame is generally a seat, pedals which are placed in communication with one or more of the wheels by a drive means such as a chain, and a steering mechanism such as handle bars.

The commonly known and accepted unicycle, conversely, employs only a single wheel. Mounted to the single wheel is an abbreviated frame which generally holds only a seat. Generally, a set of pedals is disposed on the axle of the wheel. In contrast to bicycles, conventional unicycles usually provide no hand operated steering mechanism. Indeed, the only steering mechanism included on a conventional unicycle is the shifting of the weight of the rider and the action of the rider on the pedals.

Unicycles are generally enjoyable to ride and provide the rider with a degree of flexibility and maneuverability not found in conventional bicycles. In particular, when ridden by a skilled rider, unicycles can be turned almost instantaneously and can be ridden through narrow passages and the like.

Unicycles, however, present the rider with additional difficulties not encountered by the rider of a bicycle. Specifically, the rider is presented with potential instability in various directions. Not only is it possible for the unicycle to fall laterally to the left or to the right, as is the case in a conventional bicycle, but the unicycle may also fall longitudinally, in a forward or rearward direction. Thus, learning to ride a unicycle can be extremely problematic.

Unicycles are generally harder to ride and take a much longer time to learn to ride than do conventional bicycles. Indeed, some people may be totally incapable of learning to ride a unicycle because of certain physical limitations including limitations in their sense of balance. As an additional problem, potential injuries are increased by the fact that the unicycle can fall in all possible directions. Thus, unicycle riders may be more prone to leg and ankle injuries in attempting to break a fall. Moreover, unicycle riders are vulnerable to head injuries in the event that the unicycle tips over directly backward or directly forward. All of these problems are problems not generally encountered by bicycle riders, or if encountered, are less serious for bicycle riders.

In order to overcome some of the problems in learning to ride a unicycle, some simple training attachments have been developed. For example, one such attachment essentially comprises a rack having four small wheels. The rack is attachable to a unicycle such that the unicycle is disposed in the center of the rack and the wheel of the unicycle contacts the ground at a point within the rectangle defined by the four small wheels. This provides additional stability to the unicycle in all possible directions. Thus, the novice unicyclist may learn to ride on a group of five wheels rather than on a single wheel.

Problems with this device are apparent. While the new rider may begin to get the feel of the seat and the pedals, the rider is unable to further develop the balance which is necessary to ride a unicycle. This is, of course, caused by the fact that four wheels stabilize the unicycle in all possible directions. In addition, this device is difficult to maneuver, unlike the unicycle itself. Thus, such devices are of little utility in helping a rider learn to ride a unicycle and retain few of the advantages of the unicycle itself.

Other more abbreviated unicycle training devices have also been developed. These essentially comprise attachments which protect the unicyclist from a rearward fall. These attachments include a wheel disposed directly behind the unicycle and skid plates attached to the front or rear of the unicycle.

While the unicycle training devices may aid the unicyclist in learning to ride, several serious problems still remain. For example, existing training devices do not "track" around turns so as to maintain the maneuverability of the unicycle. The training device is generally rigidly attached to the unicycle. Thus, unicycles with such devices may handle like bicycles rather than unicycles.

In addition, many unicycle training devices do not selectively stabilize the unicycle. That is, the unicycle is stabled in multiple longitudinal and lateral directions so that the training device provides little actual unicycle experience to the rider. Furthermore, the devices added to the unicycle are not generally intended to be used permanently with the unicycle because of the problems caused by such devices as discussed above.

As a result, what is needed in the art is a new unicycle-like device having increased longitudinal stability without significantly increased lateral stability. It would also be an advancement in the art to provide such a wheeled vehicle which had the feel of an actual unicycle such that a person could learn to ride a unicycle by operating such a vehicle. It would be a further advancement in the art to provide a unicycle-like device which allowed people to learn to ride the device without the need for special physical abilities. In addition, it would be an advancement in the art to provide such a wheeled vehicle which was safe and easy to ride yet which substantially retained the maneuverability of a conventional unicycle. Finally, it would be a further advancement in the art if such a vehicle could be provided which included a pair or rear support wheels which would "track" through a turn of the vehicle to allow additional performance and easier riding. Such a device is disclosed and claimed herein.

BRIEF SUMMARY AND OBJECTS OF THE INVENTION

The present invention is directed to a new and unique wheeled vehicle comprising a unicycle-like device. The device employs many of the general elements used in conventional unicycles, including a single large drive wheel having a set of pedals disposed on the axle of the wheel. By turning the pedals in the desired direction, the drive wheel, and the vehicle as a whole, can be moved forward or backward as desired.

Also attached to the drive axle of the wheel is an abbreviated frame comprising a pair of upwardly extending forks. In turn, a seat is attached to the top of the forks. Added to the general structure of the unicycle is a rearwardly projecting portion of the frame. This rearwardly projecting portion comprises a support frame. In the illustrated embodiment of the device, the forks which support the seat and the rearwardly extending support frame may comprise a single integral structure.

Attached to the support frame is an axle which holds one or more wheels. These wheels are expected to be no more than one half of the radius of the large unicycle wheel. In addition, the wheels are preferably positioned no further than twice the radius of the large unicycle wheel to the rear of the device.

The cycle of the present invention provides for easy riding. In particular, the center of gravity is located at approximately the mid point of the top of the large wheel. This allows the device to be ridden as a general unicycle, and indeed allows the rider to pull forward on the device such that only the large center wheel remains on the ground. At the same time, the device provides a new and unique recreational vehicle which allows the rider to shift his weight slightly backward such that the rear support wheels provide significant stability. Even with weight resting on the support wheels, the device maintains its manueverability.

As a result of the positioning of the rear wheels, the device has additional longitudinal stability. That is, the rider has additional stability in the forward and rearward directions. However, very little additional stability is provided in the lateral (i.e., right or left) directions. This allows the rider to get the feel of the unicycle and also allows the rider to perform virtually all of the maneuvers which can be performed on a unicycle. Thus, the present invention functions both as a training unicycle and as a unique vehicle in and of itself.

The rear wheels may be optionally removed or may be lifted off the ground once the cyclist is adequately trained in the riding of the device. In addition, the rear wheels may be left in place to allow for the performance of additional maneuvers not available to the unicyclist, or the wheels may be adjusted to accommodate riders having different skill levels.

It is expected that the small rear wheels and rear axle will be constructed in such a way that the wheels "pronate" as the device is turned. This essentially includes allowing the axle attached to the rear support wheels to rotate slightly in both the vertical and horizontal directions. This pronation feature allows the rear wheels to "track" behind the drive wheel without leaving the surface on which the device is ridden. The result is that the rider is provided with additional maneuverability in that a shift in his weight in a lateral direction will cause the rear wheels to pronate and track through a turn adding maneuverability and turning capability.

Thus, the present invention is a novel and unique recreational vehicle. The wheeled vehicle retains many of the advantages of a unicycle, including a very high degree of maneuverability. At the same time, the device removes many of the disadvantages of a unicycle such as high longitudinal instability and a resulting high level of difficulty in learning to ride unicycles and similar devices.

It is, therefore, a primary object of the present invention to provide a unicycle-like device having a stabilizing attachment which stabilizes the vehicle longitudinally, but does not substantially stabilize the vehicle in the lateral directions.

A further object of the invention is to provide a unicycle-like device which is safe and which may be ridden with no extraordinary skill or training.

Another object of the invention is to provide a unicycle-like device which is safe and easy to ride, but which is also highly maneuverable.

It is another object of the present invention to provide a unicycle-like device which has additional supporting wheels which pronate and track behind the main drive wheel of the device.

These and other objects of the invention will become apparent upon reading the following detailed description and appended claims, and upon reference to the accompanying drawings.

DETAILED DESCRIPTION OF THE PREFERRED EMBODIMENTS

Figure 1:
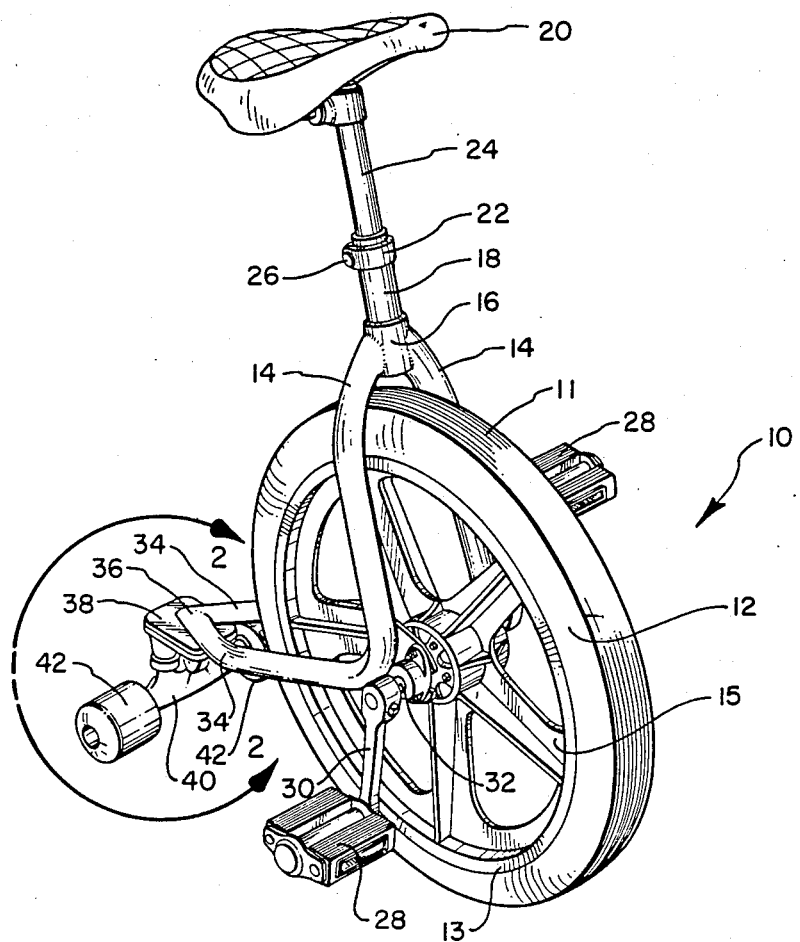
FIG. 1 is a perspective view of the wheeled vehicle of the present invention.

The present invention can be best understood by reference to the drawings wherein like parts are designated with like numerals throughout. Referring more particularly to FIG. 1, one embodiment of the wheeled vehicle of the present invention is generally designated 10. As can be appreciated with reference to FIG. 1, wheeled vehicle 10 has essentially the same basic structure as a conventional unicycle. However, the wheeled vehicle 10 has been substantially modified to accomplish the purposes and objects set out above.

In particular, the wheeled vehicle of the present invention includes a main drive wheel 12. Main drive wheel 12 may be similar in construction to those used generally in unicycles or small bicycles. In particular, drive wheel 12 will generally include a tire 11 secured to a rim 13. Extending from the rim 13 to the center of the wheel will be spokes 15. Spokes 15 may be of any type conventional in the bicycle or unicycle art. Spokes 15 may include a series of small wire spokes, or, as illustrated in FIG. 1, may include fewer larger forks molded integrally with rim 13.

Attached to the main drive wheel 12 is a means for supporting a rider on the wheeled vehicle. In particular, the embodiment of the present invention disclosed in FIG. 1 includes a pair of forks 14 which extend generally upwardly from the area of the center of drive wheel 12. Forks 14 may be of the type generally used in the art, but as modified within the scope of the invention as described below. The forks 14 join at a point 16 which is located generally above the main drive wheel 12. As discussed more fully below, forks 14 may form a portion of a larger integral frame.

Above point 16, forks 14 combine to form a conventional seat post 18. Seat post 18 may be of the adjustable type so that the position of seat 20 may be adjusted to accommodate different sizes of riders. In particular, a clamp 22 may be disposed around the top of seat post 18. Simultaneously, a seat post extension 24 may travel within the interior of seat post 18 such that seat 20 may be raised or lowered as necessary. Once the seat 20 is placed in the desired position, bolt 26 may be tightened so that seat post extension 24 is secured at the correct level within seat post 18.

An additional important structural feature of the wheeled vehicle 10 is the drive means. While other types of drive means may be incorporated into the device, it is expected that the preferred embodiment of the vehicle 10 will include a pair of pedals 28, which is in turn securely attached by conventional means to pedal hangers 30. Pedal hangers 30, are then attached to the drive axle 32 which is disposed within, and connected to, the center of main drive wheel 12. Alternatively, pedals 28 may be attached through an opening disposed in the forks 14.

As a result, it can be appreciated that wheeled vehicle 10 can be propelled in much the same way as other similar self-propelled wheeled vehicles, such as unicycles. In particular, when the rider sits upon seat 20, the rider's feet are placed upon pedals 28 which are rotated in much the same manner as those of conventional unicycles and bicycles. The rotation of pedals 28 causes main wheel 12 to turn in the forward or reverse direction depending on the direction in which the rider turns pedals 28. This motion is sufficient to propel the vehicle in the desired forward or reverse direction at the desired speed.

As briefly discussed above, the wheeled vehicle 10 of the present invention includes a longitudinal support means. That means assures that the device possesses additional stability in the longitudinal (i.e., forward and backward) directions so that the wheeled vehicle is easier and safer to ride. At the same time, the longitudinal support means does not substantially effect the lateral stability (i.e., to the left and right) of the wheeled vehicle. Thus, the vehicle 10, retains much of the feel of a unicycle while at the same time having the very significant advantage of longitudinal stability.

The longitudinal support means may take a variety of specific forms including a separate rearwardly extending set of forks or a structure extending from the area of the seat post 18. In the illustrated embodiment the longitudinal support means includes a rearwardly and downwardly extending support frame 34 which is formed integrally with the upwardly extending forks 14. This support frame 34 extends to a point to the rear of the main drive wheel 12 so that the support frame 34 does not interfere with the rotation of main drive wheel 12. Similarly to forks 14, the two parallel segments of support frame 34 join at a point 36 which is remote from their point of interconnection with the center area of wheel 12. In the embodiment of wheeled vehicle 10 illustrated in FIG. 1, the two segments of support frame 34 are joined at point 36 and then secured to support plate 38.

In order to retain the maneuverability of wheeled vehicle 10 and the performance features of a unicycle, it is currently preferred that support frame 34 extend in the rearward direction no further than two times the radius of wheel 12. If the device were extended substantially further to the rear it would tend to lose its maneuverability and begin to handle more like a bicycle. The device would also lose the general feel of a unicycle.

As illustrated in FIG. 1, axle 40 is in turn securely attached to a support plate 38. Axle 40 is attached such that it rests in a position which is essentially parallel to drive axle 32 and perpendicular to the plane defined by wheel 12.

Attached to axle 40 are one or more support wheels 42. Any conventional means of attachment will be acceptable for holding wheels 42 securely in place on axle 40 but while allowing them to rotate freely. As can be appreciated with reference to FIG. 1, the illustrated embodiment of wheeled vehicle 10 employs two support wheels 42. However, it will also be appreciated that additional support wheels 42 may be added to the device for uses in particular environments, or a single elongated wheel could be used. For example, it may be possible to add an additional pair of support wheels such that there are two support wheels 42 on each end of axle 40.

It is currently expected that support wheels 42 will be significantly smaller than drive wheel 12. Specifically, in the illustrated embodiment support wheels 42 are smaller than one-half the diameter of main wheel 12. Again, the size of support wheels 42 provide additional longitudinal stability without interfering with the maneuverability of the device.

Support wheels 42 are attached to the remainder of wheeled vehicle 10 in such a way that axle 40 and support wheels 42 pronate or track behind wheel 12 as wheeled vehicle 10 is turned to the right or to the left. This important feature of the invention allows support and aid in turning without taking away from the other characteristics of the device. The construction of the wheeled vehicle 10 is such that angular displacement of the axle 40 is obtained during use producing a steering effect.

Figure 2:
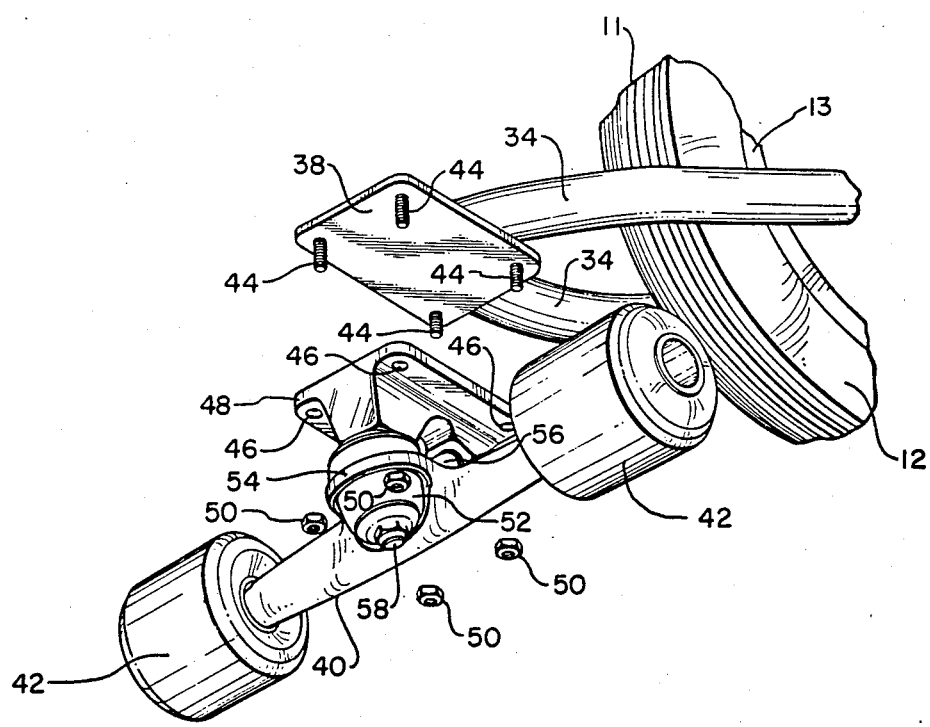
FIG. 2 is a perspective view of the support wheels, the axle connecting the support wheels, and the related mechanism within the area generally designated 2—2 in FIG. 1.

The method of allowing support wheels 42 to pronate or track behind wheel 12 can be more fully understood with reference to FIG. 2. FIG. 2 illustrates the rear portion of wheeled vehicle 10 generally shown within line 2—2 in FIG. 1. In particular, main drive wheel 12 is illustrated as are the rear portions of support frame 34. The underside of support plate 38 is also illustrated in FIG. 2. A means is disposed on support plate 38 for attaching the axle 40 and support wheels 42 to the remainder of the wheeled vehicle 10.

In the illustrated embodiment, a plurality of attaching bolts 44 are securely attached to support plate 38. Attaching bolts 44, in turn, penetrate holes 46 within bracket 48 as illustrated in FIG. 2. Once in place, attaching bolts 44 may be secured by twisting nuts 50 tightly onto the end of attaching bolts 44. In this manner, bracket 48 may be securely attached to support plate 38 such that the axle 40 and support wheels 42 are held in place with respect to the remainder of wheeled vehicle 10.

Axle 40 is attached to bracket 48 in such a manner that some pivoting of axle 40 is allowed in both the vertical and horizontal directions. One method of allowing axle 40 to pronate or pivot is to attach axle 40 to bracket 48 in the manner disclosed in FIG. 2. As illustrated in FIG. 2, a generally frustoconical rubber piece 52 is used to provide axle 40 with the freedom of movement necessary to accomplish the objects of this invention. Rubber piece 52 may be held in place in any one of a number of conventional means. The embodiment disclosed in FIG. 2, a bolt 58 protrudes through interior of rubber piece 52 and is securely attached to bracket 48.

A ring 54 is formed in axle 40 at approximately the center point of axle 40. Ring 54 is particularly configured so as to receive within its interior frustoconical rubber piece 52. In addition, axle 40 has a forward projection 56 which rests within bracket 48. This configuration allows axle 42 to pivot and rotate slightly in both the longitudinal and horizontal directions as wheeled vehicle 10 is turned.

While one embodiment of an acceptable rear assembly of the device is disclosed in FIG. 2, it will be appreciated that any structure which provides the same results will be acceptable for use in the wheeled vehicle. In particular, a device which allows support wheels 42 to pronate or track behind main wheel 12 as the device is ridden would be acceptable for use in the current invention.

Figure 3:
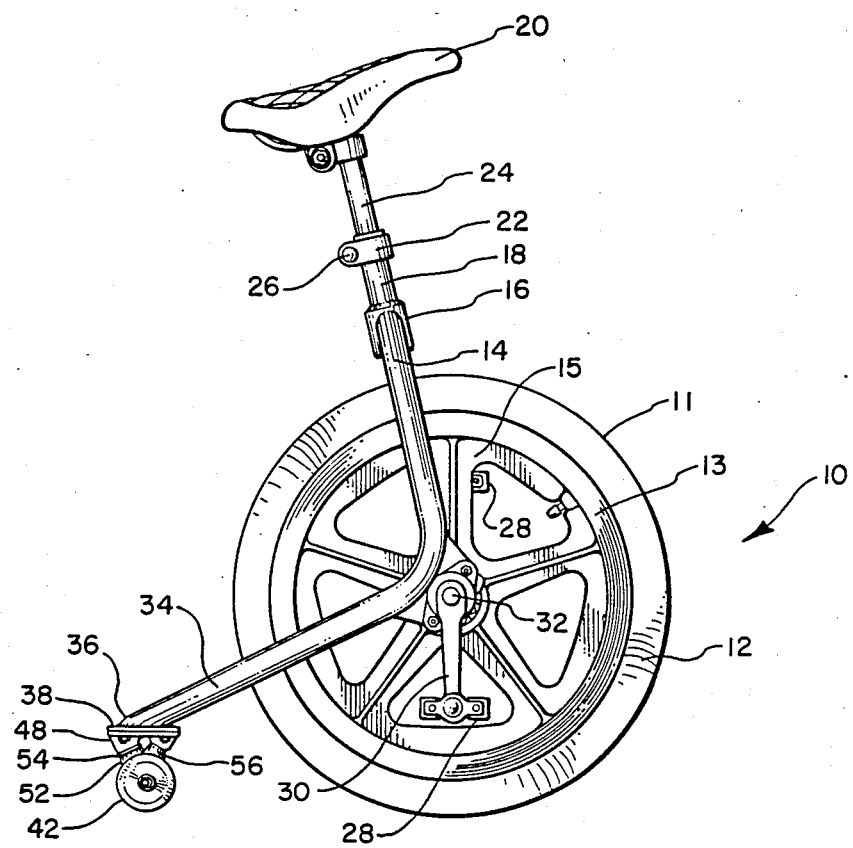
FIG. 3 is a side elevational view of the wheeled vehicle of the present invention.

FIG. 3 further illustrates the embodiment of the device described above. In particular, FIG. 3 is a side elevational view of the wheeled vehicle 10. FIG. 3 clearly illustrates the configuration of support frame 34 and the attachment mechanism for support wheels 42. In particular, support plate 38 and bracket 48 are shown in FIG. 3. It will be appreciated with reference to FIG. 3, that in the illustrated embodiment, forks 14 and support frame 34 join to form a single integral frame. Other configurations of forks 14 and support frame 34 are possible as mentioned briefly above, including separate sets of forks mechanically joined near the center of wheel 12.

Figure 4:
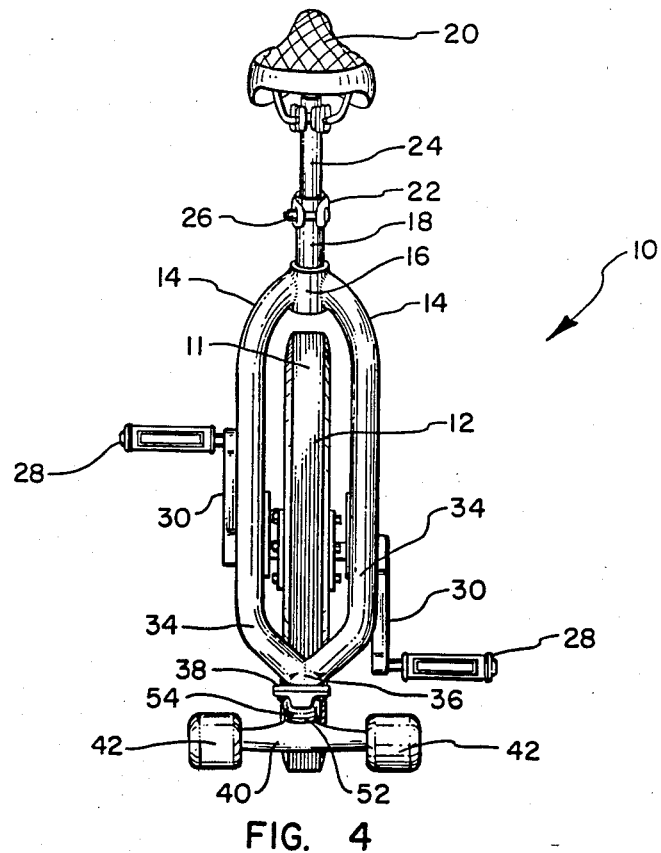
FIG. 4 is a rear elevational view of the embodiment of the invention shown in FIG. 3.

FIG. 4 is a rear elevational view of the wheeled vehicle 10 described above. The general configuration of support frame 34 and forks 14 may be appreciated with reference to FIG. 4. In particular, it may be appreciated that both the forks and the frame as shown are formed into a unitary piece.

Any material generally used to construct unicycles or bicycles is acceptable for use in constructing the current invention. In particular, materials such as steel, aluminum, and titanium may be used to construct forks 14 and support frame 34, as well as the other components of the device. It will be appreciated that pedal 28 will likely be constructed of rubber or some type of synthetic polymer which is conventional in the art. In addition, seat 20 may be constructed of rubber, leather, a synthetic polymer, or other material which is conventional in the constructing of bicycle and unicycle seats.

One configuration of wheel 12 is illustrated fully with reference to FIGS. 1 and 3. As discussed above, wheel 12 is likely to be constructed having a tire 11 and a rim 13. In turn, a plurality of spokes 15 may then extend from the area of rim 13 to the center of wheel 12. Any type of wheel which is conventional in the bicycle and unicycle arts may be acceptable for use within a wheeled vehicle 10. In addition, the rim 13 may be constructed of metal, plastic, or other types of rigid materials which are conventionally used. Likewise, spokes 15 may be constructed of steel or, in the alternative, may be constructed of plastic or molded using other types of similar material.

The method of use of the wheeled vehicle 10 can be readily appreciated with reference to the drawings and the above description. In particular, when the rider sits on seat 20, the rider's feet will, in turn, be placed on pedals 28. It will be appreciated, that the triangle created by the bottom of main drive wheel 12 and the plurality of support wheels 42 will act as a longitudinal support for the rider.

However, because of the abbreviated length of axle 40 and the pronation feature described above, the device will not provide substantial support in the lateral directions. As a result, the rider must balance the device to the left and to the right, but will receive some stability in the rearward and forward directions. This provides substantial protection against falling backward while riding the device while at the same time providing the rider with the general feel of riding a unicycle. Thus, the device may be used either as a unicycle training device or as a separate recreational vehicle.

As mentioned above, the rider can pedal the device either in the forward or rearward direction as desired. In order to turn the device, the rider simply leans to one side or the other. During a turn to the left or to the right, axle 40 and attached support wheels 42 will pronate and track behind main drive wheel 12. This is caused by the structure of the axle 40 and the associated elements described above. Thus, the rear wheels are maintained on the ground during normal riding. This, however, does not prevent the more advanced rider from tilting the vehicle forward in order to lift support wheels 42 off the ground. In addition, it is possible to adjust the position of support wheels 42 in order to make the device more or less difficult to ride as desired.

This pronation feature provides the rider with substantially increased flexibility of use over known unicycles and unicycle-like devices. In particular, the support wheels 42 do not interfere in any way with the operation of the wheeled vehicle 10. Indeed, they compliment and aid in turning the device to the right and to the left while at the same time providing longitudinal stability to the rider.

It will be appreciated that the present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed and desired to be secured by United States Letters Patent is:

1. A wheeled vehicle comprising:
    a drive wheel having a drive axle;
    a first frame member attached to the drive wheel for supporting a rider, said first frame member extending generally upwardly from the drive axle such that the center of gravity of the rider is substantially positioned over the drive axle;
    drive means for causing the drive wheel to rotate;
    at least two support wheels;
    a second frame member for fixedly positioning the support wheels in relation to the drive wheel such that the support wheels are positioned rearward of the drive wheel, said second frame member extending generally rearwardly and outwardly from the drive axle and attached to the support wheels; and
    means for allowing sufficient vertical and horizontal rotation of the support wheels to allow the support wheels to pronate as the wheeled vehicle turns such that the support wheels track rearward of the drive wheel.

2. A wheeled vehicle as defined in claim 1 wherein the support wheels are no greater in radius than one-half of the radius of the drive wheel.

3. A wheeled vehicle as defined in claim 1 wherein said second frame member is no longer than twice the radius of the drive wheel.

4. A wheeled vehicle as defined in claim 1 wherein the support wheels are secured one to another by means of an axle.

5. A wheeled vehicle as defined in claim 1 wherein the support wheels are positioned in substantially the same vertical plane as the drive wheel.

6. A wheeled vehicle as defined in claim 1 wherein said drive means is configured such that said drive means allows said drive wheel to be rotated selectively in the forward and reverse directions.

7. A wheeled vehicle as defined in claim 4 wherein the means for allowing sufficient vertical and horizontal rotation of the support wheels comprises a frustoconical piece disposed within a ring formed in the axle.

8. A wheeled vehicle as defined in claim 7 wherein the means for allowing sufficient vertical and horizontal rotation of the support wheels further comprises a bracket onto which the axle is attached and a forward projection disposed on the axle and pivotably attached to the bracket.

9. A wheeled vehicle as defined in claim 1 wherein the drive means for causing the drive wheel to rotate comprises pedals attached to the drive wheel.

10. A wheeled vehicle as defined in claim 1 wherein the first frame member comprises forks extending generally upwardly from the drive wheel.

11. A wheeled vehicle as defined in claim 10 wherein the first frame member further comprises a seat disposed on the forks extending upwardly from the drive wheel.

12. A wheeled vehicle as defined in claim 10 wherein said forks and the second frame member form a single continuous frame.

13. A recreational vehicle comprising:
    a drive wheel having a drive axle;
    a first frame member attached to the drive wheel for supporting a rider, said first frame member extending generally upwardly from the drive axle such that the center of gravity of the rider is substantially positioned over the drive axle;
    pedals attached to the drive axle for propelling the drive wheel selectively in the forward and reverse directions;
    a plurality of support wheels;
    a second frame member for attaching the support wheels to the drive wheel such that the support wheels are positioned rearward of the drive wheel and in substantially the same plane as the drive wheel, said second frame member extending generally rearwardly and outwardly from the drive axle;
    an axle securing the support wheels to one another;
    means for allowing sufficient vertical and horizontal rotation of the axle to allow the support wheels to pronate as the wheeled vehicle turns such that the support wheels track behind the drive wheel.

14. A recreational vehicle as defined in claim 13 wherein the support wheels are no greater in radius than one-half of the radius of the drive wheel.

15. A recreational vehicle as defined in claim 13 wherein the second frame member is no longer than twice the radius of the drive wheel.

16. A recreational vehicle as defined in claim 13 wherein the means for allowing sufficient vertical and horizontal rotation of the axle comprises a frustoconical piece disposed within a ring formed in the axle.

17. A recreational vehicle as defined in claim 16 wherein the means for allowing sufficient vertical and horizontal rotation of the axle further comprises a bracket onto which the axle is attached and a forward projection disposed on the axle and pivotably attached to the bracket.

18. A wheeled vehicle comprising:
    a drive wheel having a drive axle disposed through the center of the drive wheel;
    a first frame member extending generally upwardly from the drive axle such that the center of gravity of the rider is substantially positioned over the drive axle, said first frame member having a seat attached thereto;
    pedals attached to the drive axle for driving the drive wheel selectively in the forward and reverse directions;
    a pair of support wheels;
    a second frame member for attaching the support wheels to the drive wheel, said second frame member extending generally rearwardly and downwardly from the drive axle;
    an axle securing the support wheels to one another;
    means for allowing sufficient vertical and horizontal rotation of the axle to allow the support wheels to pronate as the wheeled vehicle turns such that the support wheels track behind the drive wheel, said means comprising a frustoconical piece disposed within a ring formed in the axle, a bracket onto which the axle is attached and a forward projection disposed on the axle and pivotably attached to the bracket.

19. A wheeled vehicle as defined in claim 18 wherein the support wheels are no greater in raduis than one-half of the radius of the drive wheel.

20. A wheeled vehicle as defined in claim 15 wherein said second frame member comprises support forks wherein said support forks are no longer than twice the radius of the drive wheel.

21. A unicycle training device comprising:
   a unicycle having a drive wheel and a drive axle;
   a plurality of support wheels;
   a frame member for attaching the support wheels to the unicycle, said frame member extending generally rearwardly and outwardly from the drive axle and attached to the support wheels;
   an axle securing the support wheels to one another;
   means for allowing sufficient vertical and horizontal rotation of the axle to allow the support wheels to pronate as the unicycle turns such that the support wheels track behind the unicycle.

22. A unicycle training device as defined in claim 21 wherein the support wheels are no greater in radius than one-half of the radius of the drive wheel.

23. A unicycle training device as defined in claim 21 wherein said frame member is no longer than twice the radius of the drive wheel.

24. A unicycle training device as defined in claim 23 wherein the means for allowing sufficient vertical and horizontal rotation of the axle comprises a frustoconical piece disposed within a ring formed in the axle.

25. A unicycle training device as defined in claim 24 wherein the means for allowing sufficient vertical and horizontal rotation of the axle further comprises a bracket onto which the axle is attached and a forward projection disposed on the axle and pivotably attached to the bracket.

* * * * *

UNITED STATES PATENT AND TRADEMARK OFFICE
CERTIFICATE OF CORRECTION

PATENT NO. : 4,657,272

DATED : April 14, 1987

INVENTOR(S) : James M. Davenport

It is certified that error appears in the above-identified patent and that said Letters Patent are hereby corrected as shown below:

```
Column 6, line 61, "provide" should be --provides--
Column 7, line 35, "The embodiment" should be --In the
embodiment--
Column 7, line 36, "through interior" should be --through
the interior--
Column 8, line 15, "constructing" should be --construction--
Column 10, line 64, "turns such" should be --turns, such--
```

Signed and Sealed this

Eighteenth Day of August, 1987

Attest:

DONALD J. QUIGG

*Attesting Officer*   *Commissioner of Patents and Trademarks*